United States Patent
Kim et al.

(10) Patent No.: US 10,360,157 B2
(45) Date of Patent: Jul. 23, 2019

(54) MEMORY SYSTEM AND METHOD FOR WEAR-LEVELING BY SWAPPING MEMORY CELL GROUPS

(71) Applicant: SK hynix Inc., Gyeonggi-do (KR)

(72) Inventors: Dong-Gun Kim, Gyeonggi-do (KR); Yong-Ju Kim, Seoul (KR); Sang-Gu Jo, Gyeonggi-do (KR); Do-Sun Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 174 days.

(21) Appl. No.: 15/597,866

(22) Filed: May 17, 2017

(65) Prior Publication Data

US 2018/0004677 A1    Jan. 4, 2018

(30) Foreign Application Priority Data

Jun. 30, 2016    (KR) ..................... 10-2016-0082572

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/65* (2013.01); *G06F 2212/7211* (2013.01)

(58) Field of Classification Search
CPC ............. G06F 12/1027; G06F 12/1009; G06F 2212/65; G06F 2212/7211

USPC .................................................. 711/103, 206
See application file for complete search history.

(56) References Cited

U.S. PATENT DOCUMENTS

| | | | |
|---|---|---|---|
| 8,407,410 B2 | 3/2013 | Abali et al. | |
| 8,601,202 B1 * | 12/2013 | Melcher | G11C 16/349 711/103 |
| 2016/0371019 A1 * | 12/2016 | Kang | G06F 3/0616 |

FOREIGN PATENT DOCUMENTS

KR    1020120136197    12/2012

* cited by examiner

*Primary Examiner* — Shane D Woolwine
(74) *Attorney, Agent, or Firm* — IP & T Group LLP

(57) ABSTRACT

A memory system includes a memory device including a memory block, the memory block including a plurality of memory cell groups, an address translator that maps a logical address of a data to a physical address of the memory block, and a controller configured to divide the plurality of memory cell groups into a plurality of first memory cell groups and at least one second memory cell group, and control the address translator so that the address translator maps a logical address of a data to a physical address of the first memory cell groups of the memory block and not in the at least one second memory cell group and switches the at least one second memory cell group with a selected first memory cell group among the plurality of the first memory cell groups when a predetermined period of time elapses.

17 Claims, 5 Drawing Sheets

MEMORY SYSTEM AND METHOD FOR WEAR-LEVELING BY SWAPPING MEMORY CELL GROUPS

CROSS-REFERENCE TO RELATED APPLICATIONS

The present application claims priority under 35 U.S.C. 119(a) to Korean Patent Application No. 10-2016-0082572, filed on Jun. 30, 2016, which is incorporated herein by reference in its entirety.

BACKGROUND

1. Field

Exemplary embodiments of the present invention relate generally to a memory system including a non-volatile memory device and, more particularly, to a memory system that performs wear-leveling on a non-volatile memory device and a method for operating the memory system.

2. Description of the Related Art

The paradigm for computing environments is shifting toward ubiquitous computing which allows users to use computer systems anywhere and at any time. For this reason, demand for portable electronic devices, such as mobile phones, digital cameras and laptop computers is soaring. Those electronic devices generally include a memory system which includes a memory device as a main memory unit or an auxiliary memory unit.

A memory system employed does nut include any mechanical driving unit and, thus, may have excellent stability and durability. Also, a memory system has fast data access and low power consumption. Non-limiting examples of memory systems include Universal Serial Bus (USB) memory devices, memory cards of diverse interfaces, Solid-State Drives (SSD) and the like.

Non-limiting examples of the memory device used for the memory system may include a non-volatile memory device, such as a Read Only Memory (ROM), a Mask ROM (MROM), a Programmable ROM (PROM), an Erasable Programmable ROM (EPROM), an Electrically Erasable Programmable ROM (EEPROM), a Ferroelectric Random Access Memory (FRAM), a Phase-Change RAM (PRAM), a Magnetoresistive RAM (MRAM), a Resistive RAM (RRAM), a flash memory and the like.

Non-volatile memory devices are fabricated in a higher degree of integration and consume less power in operation than volatile memory devices. However, generally, non-volatile memory devices have inferior performance and endurance relative to volatile memory devices. Non-volatile memory devices may wear down as they perform write and erase operations. Therefore, the number of times that the data stored in a memory device are changed is limited. If the write operation and/or the erase operations are more intensively performed in a particular portion of a memory device, that particular portion may be worn down faster than the rest of the memory device, and may, thus, reduce the performance of the entire memory device. In some worst cases, the memory cells of the particular portion of the memory device may lose data storing capability, thus significantly affecting the lifespan of the memory device. Therefore, in order to increase the lifespan of a nonvolatile memory device, various methods have been developed which are known generally as "wear leveling" methods and which generally control the operations of the entire memory device so that all its memory locations are worn down equally.

SUMMARY

Embodiments of the present invention are directed to a memory system including a memory device that employ a novel wear leveling method. More specifically the memory system may make the entire portion of the memory device evenly used by dividing the data storage space of the memory device into data storage segments and using the data storage segments rotationally, and a method for operating the memory system.

In accordance with an embodiment of the present invention, a memory system includes: a memory device including a memory block, the memory block including a plurality of memory cell groups; an address translator that maps a logical address of a data to a physical address of the memory block; and a controller configured to: divide the plurality of memory cell groups into a plurality of first memory cell groups and at least one second memory cell group, and control the address translator so that the address translator maps a logical address of a data to a physical address of the first memory cell groups of the memory block and not in the at least one second memory cell group and switches the at least one second memory cell group with a selected first memory cell group among the plurality of the first memory cell groups when a predetermined period of time elapses.

The selected first memory cell group may be disposed adjacent to the at least second memory cell group in a first direction.

The switching the at least one second memory cell group with a selected first memory cell group among the plurality of the first memory cell groups may include re-mapping a logical address that is mapped to a physical address of the selected first memory cell group to the physical address of the at least one second memory cell group.

The controller may be further configured to detect a hot data, and control, when a hot data is detected, the address translator to map a logical address of the hot data to a physical address of the second memory cell group.

The switching the at least one second memory cell group with a selected first memory cell group among the plurality of the first memory cell groups may further include remapping the logical address of the hot data to the physical address of the selected first memory cell group.

Whenever a new hot data is detected, the controller may control the address translator to re-map a logical address of an existing hot data that is mapped to the physical address of the at least one second memory cell group to a physical address of a corresponding original memory cell group for the logical address of the existing hot data, and map a logical address of the new hot data to the physical address of the at least one second memory cell group.

The controller may detect a data that is accessed by a host a number of times equal to or greater than a reference number and classifies the data as the hot data.

The controller may detect the hot, data by counting the number of times that a read operation or a write operation is performed for a data and comparing the counted number of times with the reference number.

Each of the plurality of the memory cell groups may include a plurality of memory cells coupled to one word line.

In accordance with another embodiment of the present invention, a method for operating a memory system including a memory device including a plurality of memory blocks, the memory block including a plurality of memory cell groups, includes: dividing the plurality of memory cell groups into a plurality of first memory cell groups and at least one second memory cell group; mapping a logical address of a data to a physical address of the first memory cell groups of the memory block and not in the at least one second memory cell group; and shifting the at least one second memory cell group among the plurality of the first memory cell groups by switching the at least one second memory cell group with a selected first memory cell group among the plurality of the first memory cell groups when a predetermined period of time elapses.

The switching the at least one second memory cell group with a selected first memory cell group may include re-mapping a logical address that is mapped to a physical address of the selected first memory cell group to the physical address of the at least one second memory cell group.

The selected first memory cell group may be disposed adjacent to the first memory cell group in a first direction among the first memory cell groups.

The selected first memory cell group may be defined as the new at least one second memory cell group and the previous at least one second memory cell group may be defined as one of the first memory cell groups.

The method for operating a memory system including a memory device including a plurality of memory blocks, the memory block including a plurality of memory cell groups, may further include: detecting a hot data; and mapping a logical address of the hot data to a physical address of the at least one second memory cell group when the hot data is detected.

The switching the at least one second memory cell group with a selected first memory cell group may further includes re-mapping the logical address of the hot data to the physical address of the selected first memory cell group.

The mapping of the logical address of the hot data to the physical address of the second memory cell group may include whenever a new hot data is detected, re-mapping a logical address of an existing hot data that is mapped to the physical address of the second memory cell group to a physical address of a corresponding original first memory cell group.

The detecting the hot data may include detecting a data that is accessed by a host a number of times equal to or greater than a reference number.

The detecting of the hot data may include: counting the number of times that a read operation or a write operation is requested by the host to be performed for a data; and comparing the counted number of times with the reference number.

Each of the plurality of the memory cell groups may include a plurality of memory cells coupled to one word line.

In accordance with further embodiment of the present invention, a method for operating a memory system including a memory device including a plurality of memory blocks, the memory block including a plurality of memory cell groups, includes: dividing the plurality of memory cell groups into a plurality of first memory cell groups and at least one second memory cell group; mapping a logical address of a data to a physical address of the first memory cell groups of the memory block and not in the at least one second memory cell group; mapping a logical address of a hot data to physical address of the at least one second memory cell group when the hot data is detected; and switching the at least one second memory cell group with a selected first memory cell group among the plurality of the first memory cell groups when a predetermined period of time elapses.

DETAILED DESCRIPTION

Figure 1:
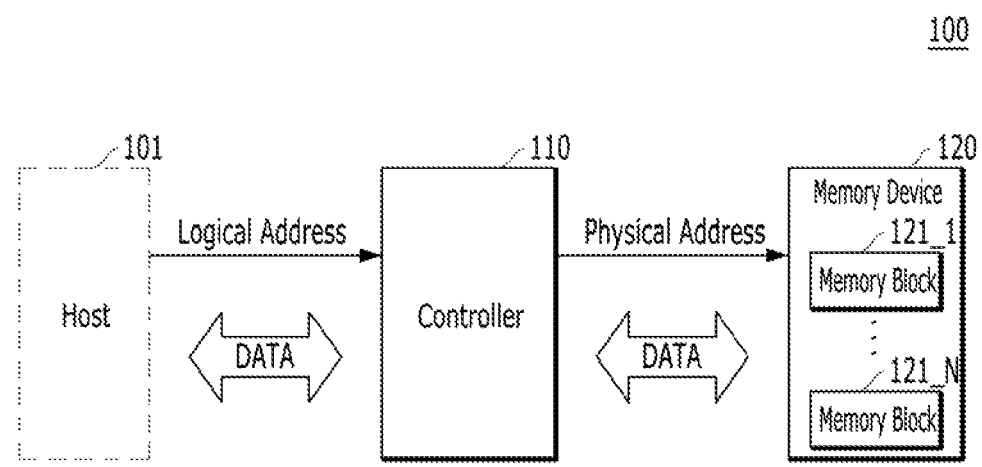
FIG. 1 is a block diagram illustrating a memory system that performs wear leveling.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the relevant art. Throughout the disclosure like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

FIG. 1 is a block diagram illustrating a memory system 100 that performs wear leveling.

Referring to FIG. 1 the memory system 100 may operate in response to a request from a host 101. For example, the memory system 100 in response to a write request received from the host 101 may store data DATA corresponding to the received write request in the memory device 120. The data DATA which are stored in the memory system 100 and, more particularly, in the memory device 120 are accessible by the host 101. The memory system 100 may be used as a main memory unit or an auxiliary memory unit of the host 101. Herein, the memory system 100 may be one among diverse kinds of storage devices according to host interface protocol for connection with the host 101. For example, the memory system 100 may be a Solid-State Drive (SSD), a Multi-Media Card (MMC), such as an embedded MMC (eMMC), a reduced size MMC (RS-MMC) and a micro-MMC, a Secure Digital (SD) Card, such as a mini-SD and a micro-SD, a Universal Storage Bus (USB) storage device, a Universal Flash Storage (UFS) device, a Compact Flash (CF) card, a Smart Media card, a memory stick and the like.

The memory system 100 may include the memory device 120 for storing the data DATA, and a controller 110 which is operatively coupled to the host 101 and to the memory device 120 for controlling the transfer and storing of the data DATA from the host 101 to the memory device 120. The controller 110 may also control the transfer of data DATA which are stored in the memory device 120 to the host 101 upon receipt of a read request form the host 101. The memory device 120 may include a non-volatile memory device. The memory device 120 may, for example, be or include a Read Only Memory (ROM), a Mask ROM (MROM), a Programmable ROM (PROM), an Erasable Programmable ROM (EPROM), an Electrically Erasable Programmable ROM (EEPROM), a Ferroelectric Random Access Memory (FRAM), a Phase-Change RAM (PRAM), a Magnetoresistive RAM (MRAM), a Resistive RAM (RRAM), a flash memory and the like.

In other words, the memory device 120 may retain the data stored therein, even though power supply is cut off, and store the data DATA transferred from the host 101 through a write operation and transfer the stored data DATA to the host 101 through a read operation. The memory device 120 may include a plurality of memory blocks 121_1 to 121_N. Each of the memory blocks 121_1 to 121_N may include a plurality of memory cells arranged in groups of memory cells that are coupled to a plurality of corresponding word lines WL. A group of memory cells all operatively coupled to the same word line is referred to as a page. For example, the memory device 120 may be a flash memory device in which a memory cell group coupled to one word line represents a page and a write operation and a read operation may be performed on the basis of a page. In an embodiment the memory device 120 may be a NAND flash memory. In yet another embodiment, the memory device 120 may be a NOR flash memory.

The controller 110 of the memory system 100 may control the memory device 120 in response to a request from the host 101. For example, the controller 110 may transfer the data DATA that are read out of the memory device 120 to the host 101 and store the data DATA that are transferred from the host 101 in the memory device 120. To this end, the controller 110 may control the operations of the memory device 120, such as a read operation, a write operation, and an erase operation.

According to an embodiment of the present invention, the controller 110 may perform a mapping operation in which the controller 110 maps a logical address of an input data transferred from the host 101 to a physical address, which represents the location that the input data are to be stored in the memory device 120. The controller 110 may manage the mapping information of the input data on the basis of a memory block 121_1 to 121_N of the memory device 120. The unit of managing the mapping information may be decided by taking in consideration the overhead of the memory system 100 for the mapping operation.

The host 101 may repeatedly access a data of a predetermined logical address, and the controller 110 may perform a wear leveling operation to prevent the physical regions of the memory device 120 from wearing down unevenly. In other words, the controller 110 may change the mapping relationship between the logical addresses and the corresponding physical addresses so that the physical regions of the memory device 120 may wear down evenly. For example, the controller 110 may detect a logical address that is repeatedly accessed by the host 101, and re-map the detected logical address to a physical address of a physical region that has not accessed by the host 101 or has been accessed less frequently. The controller 110 may keep count of the number of times that a read operation and/or a write operation is performed for a logical address, and may decide a logical address to be a frequently accessed logical address if the number of times that a read operation and/or a write operation is performed for the logical address is equal to or greater than a predetermined reference number. In this way, if a logical address is determined to be a frequently accessed logical address, then the controller 110 may change the physical address corresponding to the frequently accesses logical address to reduce differences in the extent of wearing down among the physical regions of the memory device 120. The structure of the memory system 100 that performs wear leveling in accordance with an embodiment of the present invention is described below in detail with reference to FIG. 2.

Figure 2:
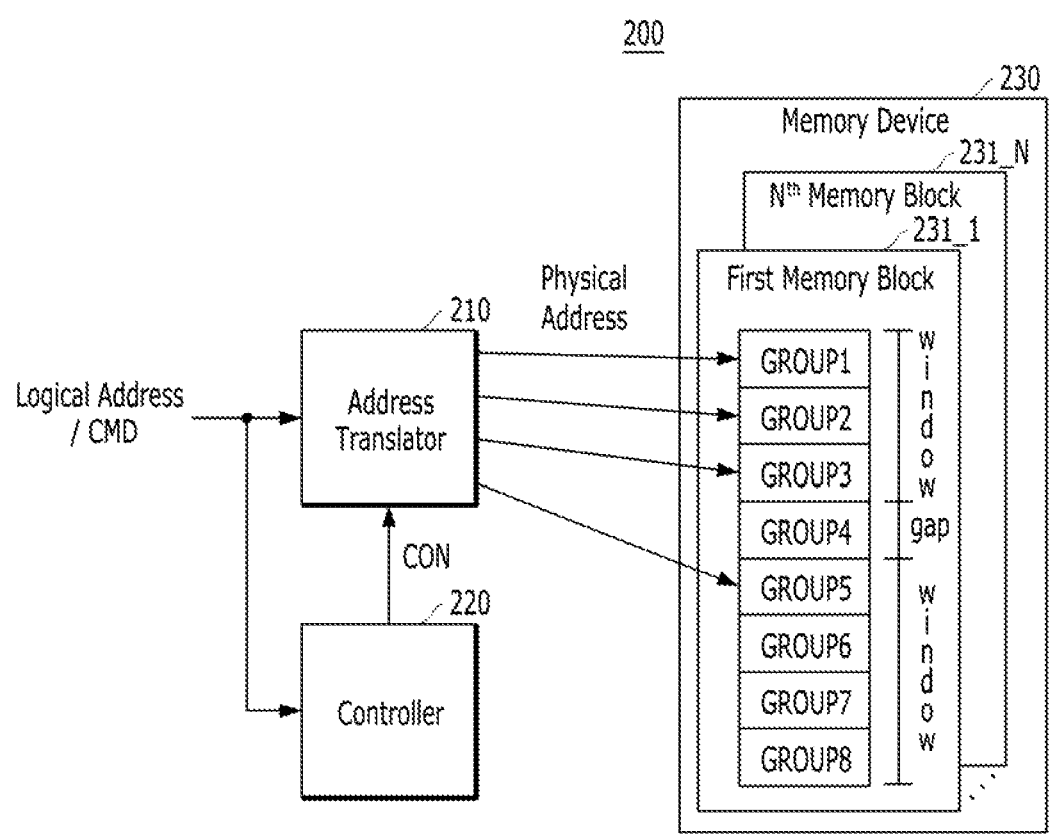
FIG. 2 is a block diagram illustrating a memory system according to an embodiment of the present invention.

FIG. 2 is a block diagram illustrating a memory system 200 in accordance with an embodiment of the present invention. Referring to FIG. 2, the memory system 200 may include an address translator 210, a controller 220, and a memory device 230.

The memory device 230 of the memory system 200 may include a plurality of memory blocks 231_1 to 231_N just like the memory device 120 of FIG. 1. Also, each of the memory blocks 231_1 to 231_N may include memory cell groups that are coupled to a plurality of word lines. Herein, FIG. 2 representatively shows a first memory block 231_1 among the memory blocks 231_1 to 231_N, and it is assumed that the first memory block 231_1 includes eight memory cell groups GROUP1 to GROUP8. However, it is obvious to those skilled in the art that the concept and spirit of the present invention are not limited to any specific number of memory cell groups.

In accordance with an embodiment of the present invention, the address translator 210 may map a logical address of a data that is requested by a host (not shown) to a physical address among the physical addresses of the memory cell groups GROUP1 to GROUP8 of the first memory block 231_1. Herein, at least one memory cell group, for example, the fourth memory cell group GROUP4, among the memory cell groups GROUP1 to GROUP8 may be selected as a gap region that is not mapped. In short, the fourth memory cell group GROUP4 may remain as an empty space where no data are stored. The address translator 210 may select the first to third memory cell groups GROUP1 to GROUP3 and the fifth to eighth memory cell groups GROUP5 to GROUP8 as window regions, and map the logical address of the data requested by the host to the window regions.

The controller 220 of the memory system 200 may shift the gap region among the window regions at a predetermined period. In other words, the controller 220 may replace the gap region with a window region whenever a predetermined time passes. For example, the controller 220 may change the fourth memory cell group GROUP4, which is decided as the gap region, into a window region, and change one among the first to third memory cell groups GROUP1 to GROUP3 and the fifth to eighth memory cell groups GROUP5 to GROUP8 which are window regions, into a gap region. In this way, the address translator 210 may re-map the logical addresses that were mapped to physical addresses corresponding to the window region that is changed into a gap region, into physical addresses of the gap region, e.g., the fourth memory cell group GROUP4 which is now being switched into a window region.

One of the methods for translating the logical address of a data into the physical address of the memory device 230 may be a start-gap method. According to the start-gap method, a gap region may sequentially shift into a neighboring window region whenever a predetermined time passes. In other words, referring to the controller 220 shown in FIG. 2, it may be seen that the gap region may be selected in the order from the fourth memory cell group GROUP4 to the fifth to eighth memory cell groups GROUP5 to GROUP8 and then the first to third memory cell groups GROUP1 to GROUP3. Of course, the gap region may be selected in the opposite direction as well.

Based on the star gap method, the address translator 210 may manage the physical address of a start region to which a start logical address is mapped and the physical address of a current gap region and perform an address translating operation. Whenever a predetermined time passes, the address translator 210 may increase the physical address of the gap region by one and, when the physical address of the gap region corresponds to a physical address of the start region, the address translator 210 may decrease the physical address of the start region by one.

For example, when it is assumed that the logical addresses of data are mapped in the order of the first to eighth memory cell groups GROUP1 to GROUP8 in the first memory block 231_1 shown in FIG. 2, the address translator 210 may manage the physical address of the first memory cell group GROUP1 as the physical address of the start region. When a logical address is inputted, the inputted logical address may be mapped to a corresponding physical address among the physical addresses of the start region. Herein, the mapped physical address may be compared with the physical address of the current gap region, and the mapped physical address may be additionally increased based on the comparison result. When the fourth memory cell group GROUP4 is selected as a gap region and the logical addresses are mapped to the physical addresses of the first to third memory cell groups GROUP1 to GROUP3, the address translator 210 may perform the address translating operation as it is. On the other hand, when the logical addresses are mapped to the physical addresses of the fourth to seventh memory cell groups GROUP4 to GROUP7, the address translator 210 may perform the address translating operation by increasing the memory cell group by one and mapping the logical addresses to the physical addresses of the fifth to eighth memory cell groups GROUP5 to GROUP8. Also, if the gap region shifts on and on and the first memory cell group GROUP1, which belongs to the start region, is selected as the gap region, the address translator 210 may reduce the physical address of the first memory cell group GROUP1 by one into the physical address of the eighth memory cell group GROUP8 and manage the physical address of the eighth memory cell group GROUP8 as the physical address of the new start region.

In accordance with the embodiment of the present invention, the controller 220 may detect a hot data that is repeatedly accessed by the host. The controller 220 may detect a data that is accessed by the host more than a predetermined number of times and classify the data as a hot data. In response to a logical address and a command CMD that are received from the host, the controller 220 may count the number of read operation and/or write operations that are performed on the particular logical address, and may compare the counted number with a reference number. If the counted number for the received logical address is equal or greater than the reference number, i.e., when the controller detects a hot data, the controller 220 then transfers a control signal CON to the address translator 210 to instruct the address translator 210 to change the mapping relationship of the detected hot data. Under the control of the controller 220, the address translator 210 may re-map the logical address of the detected hot data to a physical address corresponding to the gap region of the memory device 230. Therefore, the physical region of the memory device 230 to which the logical address of the hot data was previously mapped is not accessed any more, and thus may be protected from wearing down. Also, by allocating the detected hot data to the gap region which is rotated among the memory cell groups GROUP1 to GROUP8 at regular time intervals ensures that the various memory cell groups are controlled to wear down evenly.

Figure 3A:
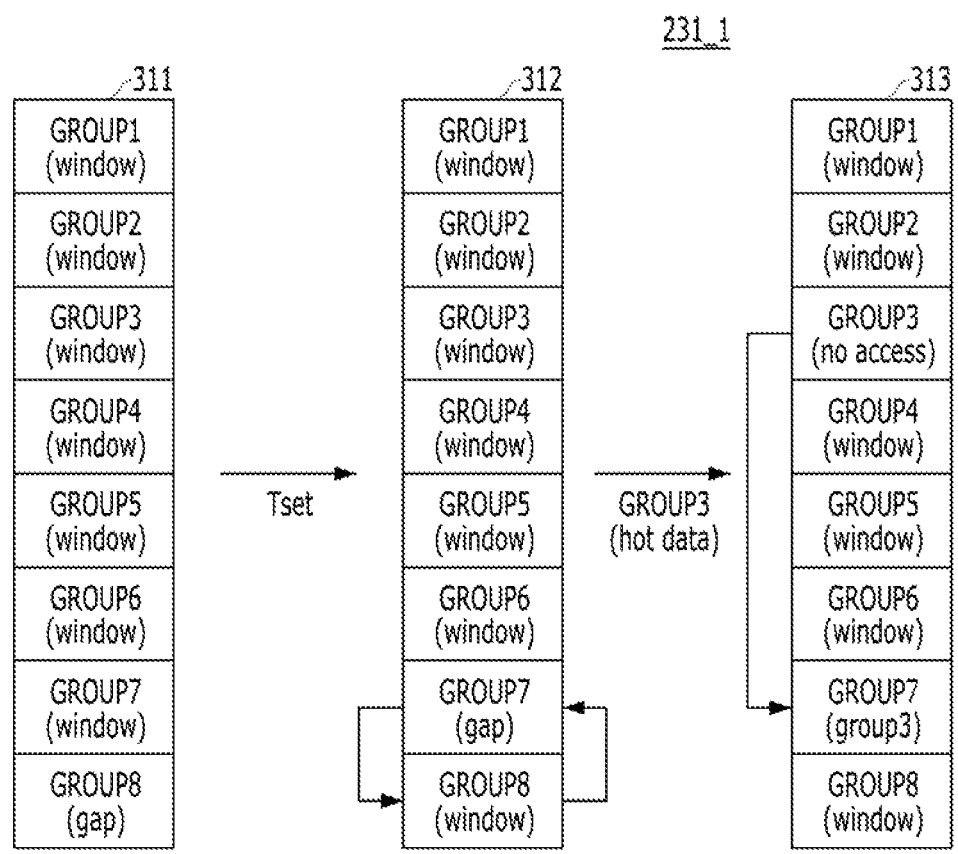
FIGS. 3A and 3B illustrate examples of an operation in a memory block shown in FIG. 2.
Figure 3B:
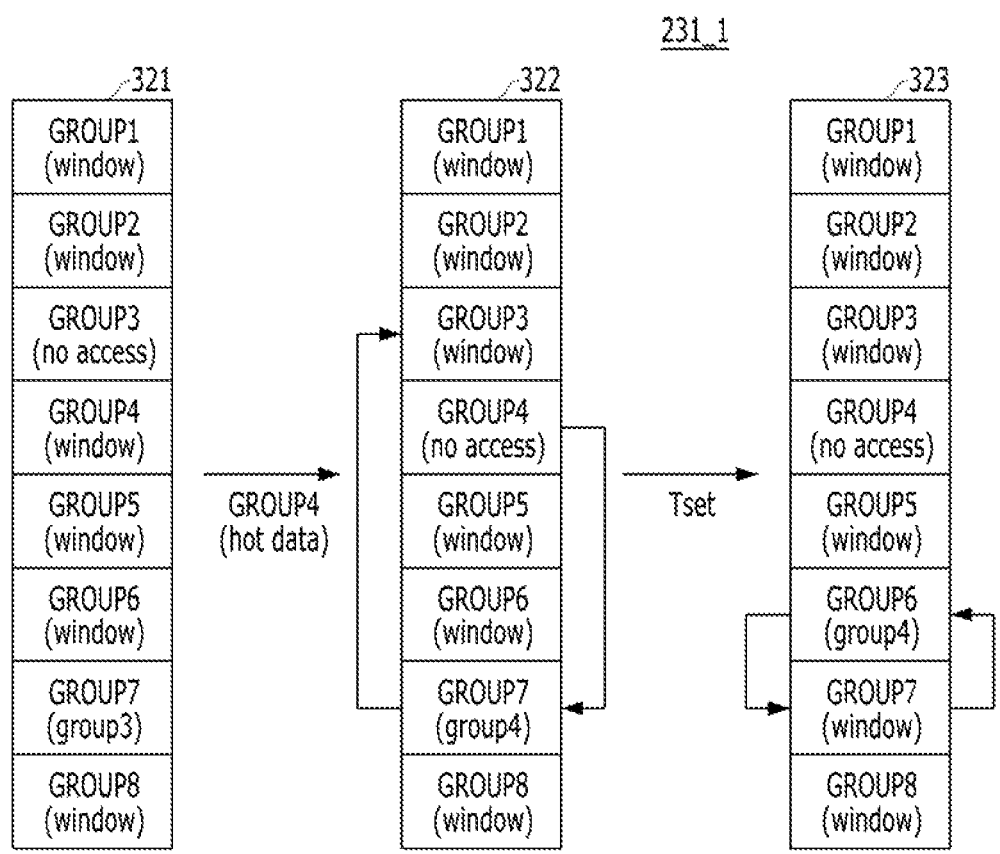

FIGS. 3A and 3B illustrate examples of an operation in the first memory block 231_1 of FIG. 2. FIGS. 3A and 3B show the change in the mapping relationship according to time or conditions of the memory cell groups GROUP1 to GROUP8 included in the first memory block 231_1.

FIG. 3A shows the operation of detecting a first hot data after dividing the memory cell groups GROUP1 to GROUP8 of the first memory block 231_1 into a gap region and window regions. FIG. 3B shows the operation of detecting a second hot data after the previous detection of the first hot data.

Referring now to FIG. 3A, the left part 311 of FIG. 3A, shows that the eighth memory cell group GROUP8 is selected as the gap region among the eight memory cell groups GROUP1 to GROUP8 included in the first memory block 231_1. This state may be pre-set during an initial operation of the memory system 200. The left part 311 of FIG. 3A, shows a state of memory groups GROUP1 to GROUP8 where no hot data has been detected yet because the host has not access a data more than a predetermined number of times. Therefore, the address translator 210 may map logical addresses of data to the physical addresses of the first to seventh memory cell groups GROUP1 to GROUP7.

As illustrated in the left part 311 of FIG. 3A, the first memory block 231_1 is divided into a gap region, i.e., GROUP 8 and window regions, i.e., GROUP1 to GROUP 7. When a predetermined time Tset passes, the gap region may shift into the window regions under the control of the controller 220. Referring to the central part 312 of FIG. 3A, it is shown that the gap region shifts from the eighth memory cell group GROUP8 to the seventh memory cell group GROUP7. In doing this shift, the address translator 210 re-maps the logical address of a data, which has been mapped to the physical address of the seventh memory cell group GROUP7, to the physical address of the eighth memory cell group GROUP8.

Later on, as time passes, the gap region may shift from the seventh memory cell group GROUP7 to the sixth memory cell group GROUP6, and then from the sixth memory cell group GROUP6 to the fifth memory cell group GROUP5 and so on so forth in this order at predetermined times under the control of the controller 220 until all the memory cell groups have been used as gap regions at least once. Once, all the memory cell groups have been used at least once as a gap region the shifting may be repeated, for example, by shifting from the memory cell group GROUP1 to the memory cell group GROUP8, then from the memory cell group GROUP8 and so on and so forth. In short, the gap region may sequentially shift into the neighboring window region in one direction. Of course, this is just an example, and the shifting of the gap region and the window regions may be performed in diverse ways. For example, gap shifting may be performed in a rotating direction opposite form the one illustrated in FIG. 3A, i.e., from memory cell group GROUP8 to memory cell group GROUP1, then from memory cell group GROUP1 to memory cell group GROUP2 and so on and so forth. As another example, instead of a rotating manner, gap shifting may be performed in an oscillatory manner shifting for example from memory cell group GROUP8 to memory cell group GROUP7, then consecutively to memory cell groups GROUP6 to GROUP1 and then shifting back from memory cell group GROUP1 consecutively to memory cell groups GROUP2 to GROUP8.

When the controller 220 detects a hot data while the gap region is shifting, the logical address of the hot data may be mapped to the physical address of the gap region. The right part 313 of FIG. 3A shows an example where the controller 220 detects a data for which a write operation is requested to be performed by the host more than a predetermined number of times and a data of the third memory cell group GROUP3 is detected as the hot data. Accordingly, the address translator 210 may re-map the logical address that has been mapped to the physical address of the third memory cell group GROUP3 to the physical address of the seventh memory cell group GROUP7, which is set as the gap region. In short, the hot data stored in the third memory cell group GROUP3 is moved into the gap region and the third memory cell group GROUP3 is not accessed any more. In this way, the extent that the frequently accessed region storing the hot data, which is the third memory cell group GROUP3, wears down and the extent that the gap region which has not been used for the time of the predetermined period, which is the seventh memory cell group GROUP7, wears down come to be balanced.

FIG. 3B shows the operation of the first memory block 231_1 while there is the hot data previously detected.

First of all, the left part 321 of FIG. 3B shows the last state of the first memory block 231_1 of FIG. 3A where the seventh memory cell group GROUP1 is set as the gap region and the third memory cell group GROUP3 was detected as a region storing the hot data. Therefore, the third memory cell group GROUP3 is not accessed any more, and the data is moved into the seventh memory cell group GROUP7, which is the gap region, to be stored therein. In short, the logical address of the data that has been mapped to the physical address of the third memory cell group GROUP3 is re-mapped to the physical address of the seventh memory cell group GROUP7, which is the gap region.

As a result, the number of times that the third memory cell group GROUP3 is accessed is not increased any more, and also the operation is performed continuously without any interruptions. When the fourth memory cell group GROUP4 is detected as a region storing another hot data (refer to the central part 322 of FIG. 3B), the data of the fourth memory cell group GROUP4 are moved into the gap region. More specifically, the logical address of the data mapped to the physical address of the seventh memory cell group GROUP7, which is the gap region, is mapped again to the physical address of the third memory cell group GROUP3, and the logical address of the newly detected hot data, which is the logical address mapped to the physical address of the fourth memory cell group GROUP4, is re-mapped to the physical address of the seventh memory cell group GROUP7. Therefore, the fourth memory cell group GROUP4, which is detected as another hot data region, is not accessed any more.

While the operation of detecting hot data is performed, the gap region shifts into the window regions under the control of the controller 220, whenever the predetermined time Tset passes. Referring to the right part 323 of FIG. 3B, it may be seen that the gap region is changed from the seventh memory cell group GROUP7 to the sixth memory cell group GROUP6. Herein, the address translator 210 may re-map the logical address of the data that has been mapped to the physical address of the sixth memory cell group GROUP6 to the physical address of the seventh memory cell group GROUP7. Also, the address translator 210 may re-map the logical address of the data that has been mapped to the physical address of the seventh memory cell group GROUP7, which is the logical address of the data of the fourth memory cell group GROUP4, to the physical address of the sixth memory cell group GROUP6.

Figure 4:
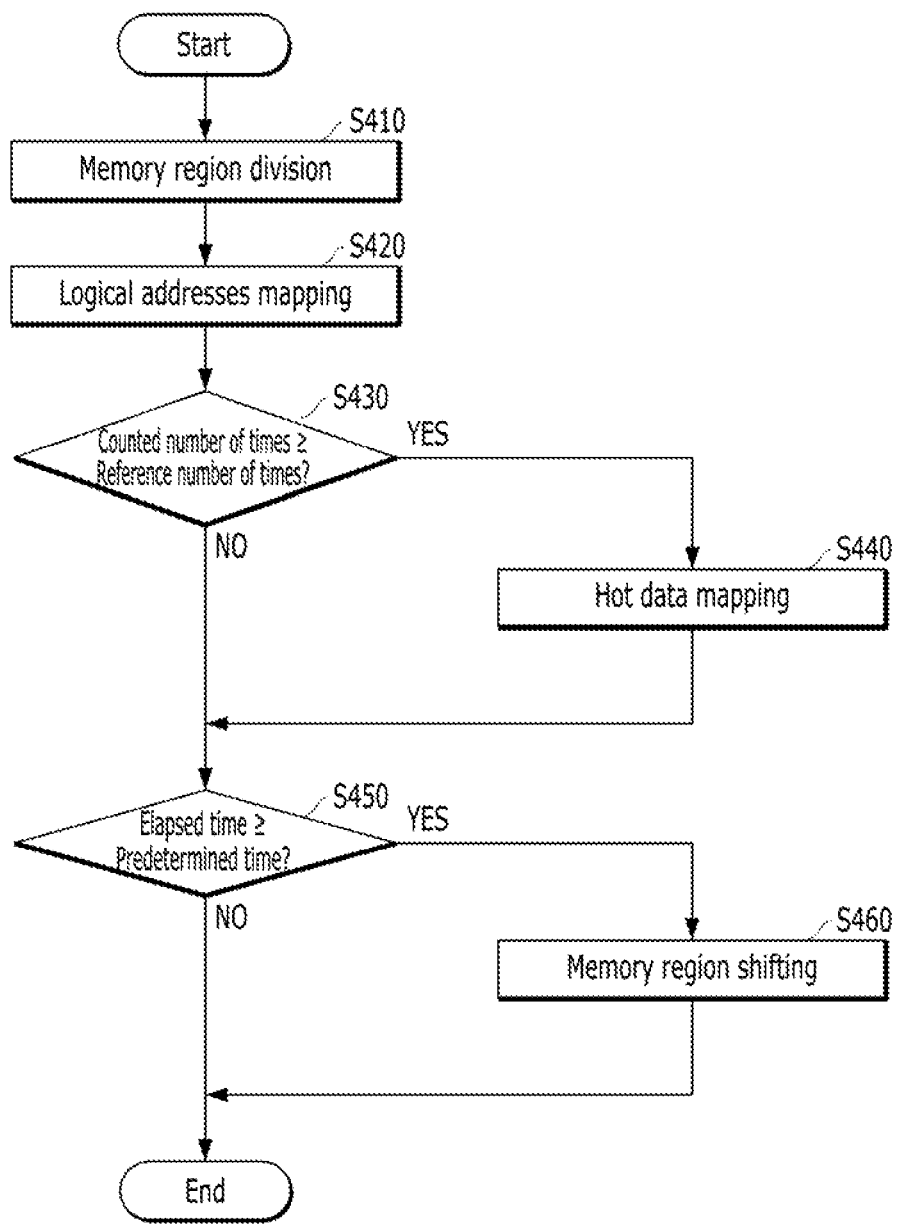
FIG. 4 is a flowchart illustrating an operation of the memory system shown in FIG. 2 according to an embodiment of the present invention.

FIG. 4 is a flowchart illustrating an operation of the memory system 200 shown in FIG. 2 in accordance with an embodiment of the present invention.

1) Memory Region Division (S410)

A plurality of memory cell groups that are included in the memory device 230 may be divided into window regions and a gap region. The window regions may include a plurality of first memory cell groups, and the gap region may include at least one second memory cell group.

2) Logical Address Mapping (S420)

The address translator 210 may map a logical address of a data requested by the host to a physical address among the physical addresses of the memory cell groups that are included in the memory device 230. Herein, the address translator 210 may map the logical address of the data to a physical address among the physical addresses of the first memory cell groups, and the address translator 210 may not perform an address mapping operation as for the second memory cell group.

3) Hot Data Detection (S430) and Hot Data Mapping (S440)

The controller 220 may detect a hot data in step S430 by detecting a data that is accessed by the host a predetermined reference number of times THset or more (access number≥THset). For example, the controller 220 may detect the hot data by counting the number of times that a write operation is requested to be performed by the host for the data and comparing the counted number of times with the reference number of times THset.

When the counted number of times is equal to or greater than the reference number of times THset (YES at step S430), the controller 220 may control the address translator 210 to map the logical address of the data, i.e., the detected hot data, to the physical address of a second memory cell group in step S440. Herein, if there is another hot data previously detected and mapped to the second memory cell group, the previous hot data may be re-mapped to its corresponding original memory cell group. When the counted number of times is less than the reference number of times THset (No at step S430), the process may proceed to step S450.

4) Predetermined Period Checking (S450) and Memory Region Shifting (S460)

The controller 220 may check out a predetermined period in step S450. When an elapsed time is equal to or greater than a predetermined time Tset (YES at step S450), the memory region may shift in step S460. Whenever the predetermined time Tset passes, the controller 220 may select one memory cell group among the multiple first memory cell groups (previously designated as windows) and switch the second memory cell group (designated as a gap) with the selected first memory cell group. For example, a memory cell group that is disposed adjacent to the second memory cell group in one direction may be sequentially selected among the first memory cell groups under the control of the controller 220. The address translator 210 may map the logical address that has been mapped to the physical address of the selected first memory cell group (i.e., the one that will become the new gap memory cell group) to the physical address of the second memory cell group (the previously designated gap memory cell group). Herein, if the second memory cell group is already mapped with the logical address of an existing hot data, the logical address of the existing hot data may be re-mapped to the physical address of the selected first memory cell group. Subsequently, the second memory cell group and the selected first memory cell group may be decided as a first memory cell group and a second memory cell group, respectively.

According to the embodiments of the present invention, a region where data are not stored, which is a region mapped with no data, is defined in a memory device, and the defined region is controlled to shift (for example rotationally) in the entire region of the memory device at a predetermined period. In this way, it is possible to prevent the access by the host from being localized into a certain region in the memory device at the predetermined period and thereby distribute the number of times that the memory device is used into the entire region, which eventually reduces the number of the times that the memory device is used.

In addition, by detecting a hot data that is frequently accessed by the host and allocating the hot data to a rotating region, the regions where hot data are stored may be distributed more equally. This makes the regions storing the hot data and the region mapped with no data wear down evenly.

While the present invention has been described with respect to specific embodiments, it will be apparent to those skilled in the art that various changes and modifications may be made without departing from the spirit and scope of the invention as defined in the following claims.

What is claimed is:

1. A memory system, comprising:
a memory device including a memory block, the memory block including a plurality of memory cell groups;
an address translator that maps a logical address of a data to a physical address of the memory block; and
a controller configured to:
divide the plurality of memory cell groups into a plurality of first memory cell groups and at least one second memory cell group, and
control the address translator so that the address translator maps a logical address of a data to a physical address of the first memory cell groups of the memory block and switches the at least one second memory cell group with a selected first memory cell group among the plurality of the first memory cell groups when a predetermined period of time elapses,
wherein when a hot data is detected, the controller controls the address translator to map a logical address of the hot data to a physical address of the second memory cell group, and when the predetermined period of time elapses, the controller controls the address translator to remap the logical address of the hot data to the physical address of the selected first cell group.

2. The memory system of claim 1, wherein the selected first memory cell group is disposed adjacent to the at least second memory cell group in a first direction.

3. The memory system of claim 1, wherein switching the at least one second memory cell group with a selected first memory cell group among the plurality of the first memory cell groups includes re-mapping a logical address that is mapped to a physical address of the selected first memory cell group to the physical address of the at least one second memory cell group.

4. The memory system of claim 3, wherein the controller is further configured to detect the hot data.

5. The memory system of claim 4, wherein whenever a new hot data is detected, the controller controls the address translator to re-map a logical address of an existing hot data that is mapped to the physical address of the at least one second memory cell group to a physical address of a corresponding original memory cell group for the logical address of the existing hot data, and map a logical address of the new hot data to the physical address of the at least one second memory cell group.

6. The memory system of claim 4, wherein the controller detects a data that is accessed by a host a number of times equal to or greater than a reference number and classifies the data as the hot data.

7. The memory system of claim 6, wherein the controller detects the hot data by counting the number of times that a read operation or a write operation is performed for a data and comparing the counted number of times with the reference number.

8. The memory system of claim 1, wherein each of the plurality of the memory cell groups includes a plurality of memory cells coupled to one word line.

9. A method for operating a memory system including a memory device including a memory block, the memory block including a plurality of memory cell groups, comprising:
- dividing the plurality of memory cell groups into a plurality of first memory cell groups and at least one second memory cell group;
- mapping a logical address of a data to a physical address of the first memory cell groups of the memory block
- mapping a logical address of a hot data to a physical address of the at least one second memory cell group when the hot data is detected; and
- shifting the at least one second memory cell group among the plurality of the first memory cell groups by switching the at least one second memory cell group with a selected first memory cell group among the plurality of the first memory cell groups when a predetermined period of time elapses, wherein the logical address of the hot data is re-mapping to the physical address of the selected first memory cell group when the predetermined period of time elapses.

10. The method of claim 9, wherein switching the at least one second memory cell group with a selected first memory cell group includes:
- re-mapping a logical address that is mapped to a physical address of the selected first memory cell group to the physical address of the at least one second memory cell group.

11. The method of claim 9, wherein the selected first memory cell group is disposed adjacent to the first memory cell group in a first direction among the first memory cell groups.

12. The method of claim 9, wherein the selected first memory cell group is defined as the new at least one second memory cell group and the previous at least one second memory cell group is defined as one of the first memory cell groups.

13. The method of claim 10, further comprising:
detecting the hot data.

14. The method of claim 13, wherein the mapping of the logical address of the hot data to the physical address of the second memory cell group includes:
- whenever a new hot data is detected, re-mapping a logical address of an existing hot data that is mapped to the physical address of the second memory cell group to a physical address of a corresponding original first memory cell group.

15. The method of claim 13, wherein detecting the hot data includes detecting a data that is accessed by a host a number of times equal to or greater than a reference number.

16. The method of claim 15, wherein the detecting of the hot data includes:
- counting the number of times that a read operation or a write operation is requested by the host to be performed for a data; and
- comparing the counted number of times with the reference number.

17. The method of claim 9, wherein each of the plurality of the memory cell groups includes a plurality of memory cells coupled to one word line.

* * * * *